(12) United States Patent
Khanka et al.

(10) Patent No.: US 8,761,775 B1
(45) Date of Patent: Jun. 24, 2014

(54) EVALUATION AND RESPONSE TO SOFT HANDOFF INCREASE IN A CELLULAR WIRELESS NETWORK

(75) Inventors: Bhagwan Khanka, Lenexa, KS (US); Sachin R. Vargantwar, Overland Park, KS (US); Deveshkumar N. Rai, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 806 days.

(21) Appl. No.: 12/787,117

(22) Filed: May 25, 2010

(51) Int. Cl.
*H04W 36/00* (2009.01)

(52) U.S. Cl.
USPC ............... 455/442; 455/61.13; 455/226.1; 455/440; 455/453

(58) Field of Classification Search
USPC ......... 455/436, 437, 438, 439, 440, 441, 442, 455/443, 444, 67.11, 67.13, 226.1, 226.2, 455/522, 453; 370/328, 331, 332, 333
See application file for complete search history.

(56) References Cited

U.S. PATENT DOCUMENTS

| | | | |
|---|---|---|---|
| 5,781,861 A * | 7/1998 | Kang et al. | 455/442 |
| 6,381,458 B1 * | 4/2002 | Frodigh et al. | 455/442 |
| 6,690,939 B1 | 2/2004 | Jonsson et al. | |
| 2003/0012217 A1 * | 1/2003 | Andersson et al. | 370/437 |
| 2003/0198203 A1 * | 10/2003 | Antonio et al. | 370/329 |
| 2005/0124369 A1 * | 6/2005 | Attar et al. | 455/522 |
| 2006/0268764 A1 * | 11/2006 | Harris | 370/328 |
| 2007/0037523 A1 * | 2/2007 | Bi et al. | 455/69 |
| 2009/0258651 A1 * | 10/2009 | Sagfors et al. | 455/442 |
| 2010/0150069 A1 * | 6/2010 | Fang et al. | 370/328 |
| 2011/0151877 A1 * | 6/2011 | Tafreshi | 455/442 |

* cited by examiner

*Primary Examiner* — Temica M Beamer

(57) ABSTRACT

A method and corresponding apparatus or system is disclosed for managing operating in a cellular wireless communication system. The method involves detecting a threshold transition of user devices (generally any wireless communication devices) that are actively operating in a given wireless coverage area into a state of soft handoff between the given coverage area and another coverage area, and perhaps a resulting threshold increase in total transmission power in the given coverage area, and responsively forcing out of the given coverage area at least one user device that is in soft handoff with the given coverage area. The method may thereby help to avoid or minimize an undesirable cyclic power increase effect that could lead to power overload.

22 Claims, 6 Drawing Sheets

```
┌─────────────────────────────────┐
│ DETECT THRESHOLD TRANSITION     │
│ OF USER DEVICES THAT ARE IN A   │
│ GIVEN WIRELESS COVERAGE         │
│ AREA INTO A STATE OF SOFT       │
│ HANDOFF BETWEEN THE GIVEN       │── 60
│ WIRELESS COVERAGE AREA AND      │
│ AT LEAST ONE OTHER WIRELESS     │
│ COVERAGE AREA                   │
└─────────────────────────────────┘
                 │
                 ▼
┌─────────────────────────────────┐
│ RESPONSIVELY FORCE AT LEAST     │
│ ONE OF THE USER DEVICES OUT     │── 62
│ OF THE GIVEN COVERAGE AREA      │
└─────────────────────────────────┘
```

EVALUATION AND RESPONSE TO SOFT HANDOFF INCREASE IN A CELLULAR WIRELESS NETWORK

BACKGROUND

To provide cellular wireless communication service, a wireless service provider typically operates a radio access network (RAN) that defines one or more wireless coverage areas in which user devices can be served by the RAN and can thereby obtain connectivity to broader networks such as the public switched telephone network (PSTN) and the Internet.

A typical RAN may include one or more base transceiver stations (BTSs) (e.g., macro network cell towers and/or femtocells), each of which may radiate to define a wireless coverage areas such as cells and cell sectors in which WCDs can operate. Further, the RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other user device (whether or not actually operated by a user) that is positioned within coverage of the RAN can then communicate with a BTS and in turn, via the BTS, with other served devices or with other entities on the transport network.

In general, a RAN will communicate with served user devices according to an agreed air interface protocol, examples of which include CDMA, iDEN, WiMAX, LTE, TDMA, AMPS, GSM, GPRS, UMTS, or EDGE, and others now known or later developed. The air interface protocol will define a mechanism to distinguish communications in one coverage area from those in adjacent coverage areas and to distinguish between communications within a given coverage area. For instance, under the CDMA protocol, each sector has a unique "PN offset" that is used to encode communications carried out in the sector in a manner that distinguishes communications carried in adjacent sectors. Further, each sector defines various control channels and traffic channels, each encoded with a respective "Walsh code". Other examples are possible as well.

A RAN will typically broadcast a pilot signal or the like respectively in each coverage area, to enable user devices to detect and evaluate cellular coverage in that area. For instance, when a user device is operating on an assigned traffic channel in a given coverage area, the user device may regularly monitor the strength (e.g., signal-to-noise ratio (SNR)) of the pilot signal in that coverage area and may likewise monitor the strength of pilot signals that may come from nearby coverage areas. If the pilot signal from an adjacent coverage area becomes sufficiently stronger than the pilot signal in the current coverage area (e.g., as a result of the user device moving toward the adjacent coverage area), the user device may then engage in control channel signaling with the RAN to arrange for a handoff from the current coverage area to the adjacent coverage area.

Under CDMA, and certain other air interface protocols, a user device can operate in more than one wireless coverage area at a time. This is particularly beneficial when a user device enters or passes through an area of overlap between two or more coverage areas, as the user device may then engage in a "soft handoff" process, in which the device communicates with both coverage areas at the same time, thus facilitating a "make before break" transition from one coverage area to another. For instance, if the user device is operating on an assigned traffic channel in coverage area A and then enters into an area of overlap between coverage areas A and B, the user device may signal to the RAN and the RAN may assign the user device a traffic channel in coverage area B, while allowing the user device to retain the assigned traffic channel in coverage area A. In this state, the user device would then communicate with the RAN concurrently through both coverage area A and coverage area B. In turn, if the user device then moves into coverage area B and out of coverage area A, the user device may engage in control channel signaling with the RAN and the RAN may release the traffic channel that was assigned to the user device in coverage area A.

To facilitate soft handoff, a user device will typically maintain in its memory an "active set" that lists the coverage areas (or "connection legs") in which the user device has assigned traffic channels, and the RAN will likewise maintain a record of the user device's active set and will communicate with the user device in each listed coverage area.

Thus, in practice, if the user device is operating in just coverage area A and then moves into an area of overlap of coverage area A and coverage area B, the user device may send a signaling message to the RAN that informs the RAN of a detected pilot signal strength for coverage area B. If the RAN agrees to allow a handoff, the RAN may then assign the user device a traffic channel in coverage area B, update the RAN's record of the user device's active set to specify coverage areas A and B, and send a handoff directive to the user device instructing the user device to operate on traffic channels in coverage areas A and B.

Similarly, if the user device is operating in coverage areas A and B and then moves into an area of overlap with coverage area C, the user device may send a signaling message to the RAN that informs the RAN of a detected pilot signal strength for coverage area C. If the RAN agrees to allow a further handoff, the RAN then assign the user device a traffic channel in coverage area C, update the RAN's record of the user device's active set to specify coverage areas A, B, and C, and send a handoff directive to the user device instructing the user device to operate on traffic channels in coverage areas A, B, and C. A similar process may of course occur as well when the user device leaves a coverage area.

In addition, as a user device operates on an assigned traffic channel in any given coverage area, the user device and RAN may typically engage in a power control process to control the transmission power used for communication on that traffic channel. Optimally, this power control process will help to keep the traffic channel communication strong enough to overcome interference stemming from other communications in the coverage area and from topographical obstructions, and will help to keep the traffic channel communication from becoming so strong that it would unduly interfere with communications by other user devices.

By way of example, the user device may regularly monitor the SNR of traffic channel communications that the user device receives from the RAN and compare the SNR to a power control setpoint. If the SNR is lower than the power control setpoint, then the user device may send to the RAN a power control command directing the RAN to increase the RAN's transmission power in an effort to improve the SNR. Whereas, if the SNR is higher than the power control setpoint, then the user device may send to the RAN a power control command directing the RAN to decrease the RAN's transmission power in an effort to avoid needlessly strong transmission. At the same time, the user device may also monitor an error rate (e.g., frame error rare) of the received signal and compare the error rate to a target error rate value. If the error rate is higher than the target, that may indicate that the power control setpoint is too low, and so the user device may increase the power control setpoint. Whereas, if the error rate is lower than the target, that may indicate that the power control setpoint is needlessly high, and so the user device may decrease the power control setpoint.

OVERVIEW

In general, as each user device engages in active communication in a given coverage area, communication traffic to and from the user device may contribute to the total level of noise in the coverage area for other user devices. Consequently, as a coverage area becomes more and more loaded, user devices in the coverage area may continue to see higher noise levels and thus lower measured SNR, and the user devices may responsively request the RAN to increase transmission power. The resulting increased transmission power to each such user device, however, may in turn further increase the noise in the coverage area, and thus further push user devices to ask for still higher transmission power. Ultimately, however, the RAN may reach its maximum transmission power in the coverage area and be unable to accommodate additional requests for increased transmission power, which may unfortunately result in dropped calls or other user-experience problems.

One solution to this problem is to have the RAN monitor its total transmission power in a coverage area and, when the total power exceeds a particular threshold (such as some percentage of the coverage area's maximum power), have the RAN force out of the coverage area one or more user devices that are in soft handoff with the coverage area. In particular, when the RAN detects such a highly loaded coverage area, the RAN can review user device active-set records to identify one or more user devices that are currently active in both that coverage area and at least one other coverage area and can then autonomously send a handoff directive to each such user device, directing the user device to remove the highly loaded coverage area from its active set. The advantage of this solution is that the user devices in soft handoff with the highly loaded coverage area should be able to seamlessly continue their communications on one or more other active set members.

While this solution may work well in some situations, however, it fails to account for another factor, namely, the potential transition of user devices that are in the coverage area into a mode of soft handoff with the coverage area. In particular, if many devices are operating in a given coverage area without the coverage area experiencing a power overload problem but then a number of those devices move into an area of overlap between the given coverage area and one or more other coverage areas, those devices may begin to experience higher interference due at least in part to interference from the other coverage area(s). As a result, a cyclic power increase effect more substantial than that described above may occur.

In particular, as the devices request increased RAN transmission power in the given coverage area, the transmission power may create further interference for other devices in the given coverage area, which, as noted above, may cause those other devices to request increased RAN transmission power in the given coverage area, thus further exacerbating the problem for the devices in the overlap area. At the same time, however, as the devices in the overlap area continue to experience increased interference, the devices will likely also request the RAN to increase transmission power in the other coverage areas of their active sets. Yet this power increase may then impact other user devices in those other coverage areas, leading to a cyclic power increase in those other coverage areas as well, and thus further exacerbating the problem for the devices in the overlap area.

Disclosed herein is a method and corresponding apparatus or system to help avoid or minimize this cyclic power increase problem. According to the method, a RAN will detect a threshold transition of user devices that are in the given coverage area into a state of soft handoff between the given coverage area and at least one other coverage area, and the RAN will responsively force at least one of the user devices out of the given coverage area.

In practice, for instance, the RAN may monitor active-set records of various user devices and may maintain rolled up data specifying a count of active user devices in the coverage area (total device count) and further specifying a count of active user devices in soft handoff between the coverage area and at least one other coverage area (soft handoff count or SHO count). The RAN may then keep track of changes in the total device count and SHO count over time. If, in a given time period, the RAN determines that the SHO count increased by a threshold extent without a corresponding threshold increase in total device count (e.g., that the SHO count increased by a threshold extent more than the total count increased), the RAN may reasonably conclude that there has been a threshold movement of user devices in the coverage area into soft handoff between the coverage area and at least one other coverage area. In response, the RAN may then proactively work to avoid the cyclic power increase problem noted above, by forcing out of the coverage area one or more of the devices that moved into soft handoff with the coverage area.

As a further enhancement, the method may also involve the RAN detecting a certain threshold level of total power increase in the coverage area, possibly resulting from the threshold increase in SHO count, and the RAN may use the power increase as an additional factor (i.e., in addition to the threshold increase in SHO count and absence of threshold increase in total device count) as a basis to trigger removal of one or more devices that are in soft handoff with the coverage area. For instance, in response to detecting a threshold increase in SHO count for the coverage area, the RAN may then evaluate change in total transmission power and change in total device count and thereby determine that, within a threshold period of time after detecting the threshold increase in SHO count, there is a threshold transmission power increase and absence of a threshold increase in total device count. In response, the RAN may then force out of the coverage area one or more devices that are in soft handoff with the coverage area.

Recognizing that the cyclic power increase effect may be magnified by cyclic power increases in each coverage area of a user device's active set, the present method may also be characterized in terms of the total device count and power increase in a given pair of coverage areas.

For instance, the method may involve the RAN first detecting a threshold increase in number of user devices that are in soft handoff with coverage area A and coverage area B. Responsive to detecting that threshold increase, the method may then involve the RAN making a determination of whether, within a predefined time, (i) there is at least a threshold increase in total transmission power in coverage area A and at least a threshold increase in total transmission power in coverage area B and (ii) there is no more than a threshold increase in total number of user devices in coverage area A and no more than a threshold increase in total number of user devices in coverage area B. Responsive to that determination being affirmative, the RAN may then remove at least one coverage area from an active set of each of at least one of the user devices that are in soft handoff with coverage area A and coverage area B, in an effort to help avoid a cyclic power overload condition. In doing so, the RAN may leave in the active set of each such user device the strongest active set member (e.g., the coverage area that for which user device has most recently reported a highest SNR), so as to help optimize the remaining communication by the user device.

These as well as other aspects, advantages, and alternatives will become apparent to those of ordinary skill in the art by reading the following detailed description with reference where appropriate to the accompanying drawings.

DETAILED DESCRIPTION

Figure 1:
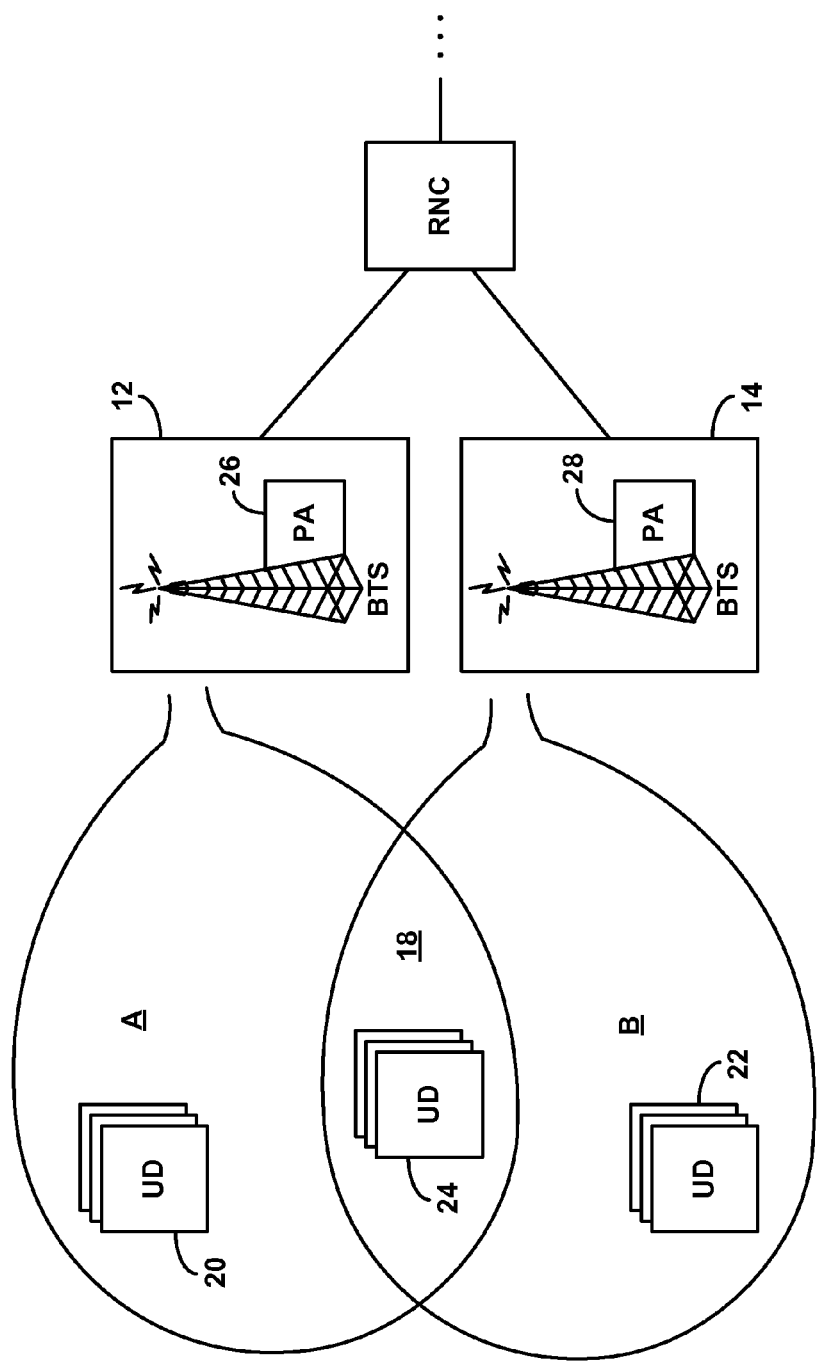
FIG. 1 is a simplified block diagram depicting a radio access network arrangement in which an exemplary embodiment of the present method can be implemented.

Referring to the drawings, as noted above, FIG. 1 is a simplified block diagram of a radio access network (RAN) arrangement in which an exemplary embodiment of the present method can be implemented. In particular, the figure depicts two base transceiver stations (BTSs) 12, 14 radiating respectively to define first and second coverage areas A, B in which user devices can operate, and the figure depicts the BTSs being coupled with a radio network controller (RNC) 16 that provides a connection to other RAN infrastructure or transport networks (not shown). Although the figure depicts each BTS radiating to define one of the coverage areas, it will be understood that both coverage areas could instead emanate from a single BTS (e.g., as respective cell sectors). Further, numerous other variations are possible from the basic arrangement shown.

As further illustrated, a number of user devices may be actively operating in each of the depicted coverage areas, with some operating in the overlap area 18 between the two coverage areas and thus in soft handoff with the coverage areas. In particular, for sake of example, the figure depicts a number of user devices 20 operating in coverage area A, a number of user devices 22 operating in coverage area B, and a number of user devices 24 operating in overlap area 18 and thus in soft handoff with coverage areas A and B.

The assumption in this figure is that all of the illustrated user devices are in active communication in the sense that they each have an assigned air interface traffic channel in the coverage area where they are located. Thus, each user device 20 has an assigned traffic channel in coverage area A, each user device 22 has an assigned traffic channel in coverage area B, and each user device 24 has both an assigned traffic channel in coverage area A and an assigned traffic channel in coverage area B. The active set of each user device, maintained by both the user device and the RAN, indicates these traffic channel assignments or more generally indicates the coverage area(s) in which the user device is currently active.

In practice, other user devices (not shown) may be operating in either coverage area but may be idle or dormant and may thus not currently have an assigned air interface traffic channel. Further, although only two coverage areas are shown, there may (and likely will) be additional coverage areas as well, including other coverage areas that overlap those shown. Consequently, the illustrated user devices may be in soft handoff with another coverage area. That said, at issue in the present method may be the extent to which user devices are, or transition to being, in soft handoff between coverage areas A and B, or other particular soft handoff. Alternatively, the issue may be more generally the extent to which user devices are in soft handoff with a given coverage area.

As further shown in FIG. 1, each BTS includes a respective power amplifier 26, 28, which the base station uses to amplify and set air interface transmission power. In practice, the BTS may have at least one such power amplifier for each coverage area (e.g., cell sector) defined by the BTS. Further, each power amplifier may have an adjustable gain, and the total transmission power provided by the power amplifier may be allocated among various co-existing air interface channels in the coverage area. For instance, if the air interface protocol used by the RAN defines overhead control channels (e.g. paging channel, sync channel, and pilot channel) and selectively assignable traffic channels, the BTS may be set to allocate its total transmission power among those various channels. In an example implementation, the BTS may output control channel transmissions at fixed transmission power levels, and the BTS may then allocate some or all of the remaining available power among assigned traffic channels, preferably with a maximum allocation per traffic channel. Further, the power amplifier itself will have a maximum gain. Thus, the maximum amplifier gain and the maximum allowed power per traffic channel may cooperatively define a practical limit on the extent to which the RAN can increase traffic channel transmission power for communication to any given user device.

RNC 16 may function to control each BTS and specifically to control various air interface operations. For example, the RNC may control handoff of user devices between coverage areas. In particular, as a user device monitors pilot SNR of various coverage areas, the user device may transmit SNR measurement messages (e.g., pilot strength management messages) in control channel messages via a serving BTS to the RNC. The RNC may then decide, based on the SNR measurements provided by the user device, whether to approve a handoff of the user device. For instance, if the user device is operating in coverage area A (as one of devices 20) and begins detecting a strong enough pilot signal from coverage area B, the user device may report to the RNC its measured SNR for coverage area and its measured SNR for coverage area B. If coverage area B is not too heavily loaded, the RNC may then responsively add coverage area B to the user device's active set and send to the user device a corresponding handoff directive, so that the user device will then transition to be in soft handoff with coverage areas A and B (as one of devices 22).

As another example, the RNC may function to control transmission power used by the serving BTS to communicate with each active user device. In particular, for each coverage area under its control, the RNC may maintain a record of the transmission power being used on each assigned traffic channel and a record of the total available transmission power, and the RNC may engage in control signaling with the serving BTS to adjust transmission power as necessary. The RNC may then exchange power control signaling with user devices to facilitate the power control process described above. For instance, the user device may compare the SNR of received traffic channel communications to a power control setpoint and then send to the RNC a power-up or power-down command based on the comparison. If appropriate, the RNC may then direct the serving BTS to increment or decrement the transmission power that the BTS is using on the user device's traffic channel.

In an alternative embodiment, some or all of these and other RNC functions can be carried out by one or more serving BTSs instead. For instance, a BTS itself may manage its own transmission power levels and may thus itself engage in substantive power control signaling with served user devices. For simplicity and without limitation, however, this description will refer to the RNC as the entity carrying out these and other functions.

Figure 2:
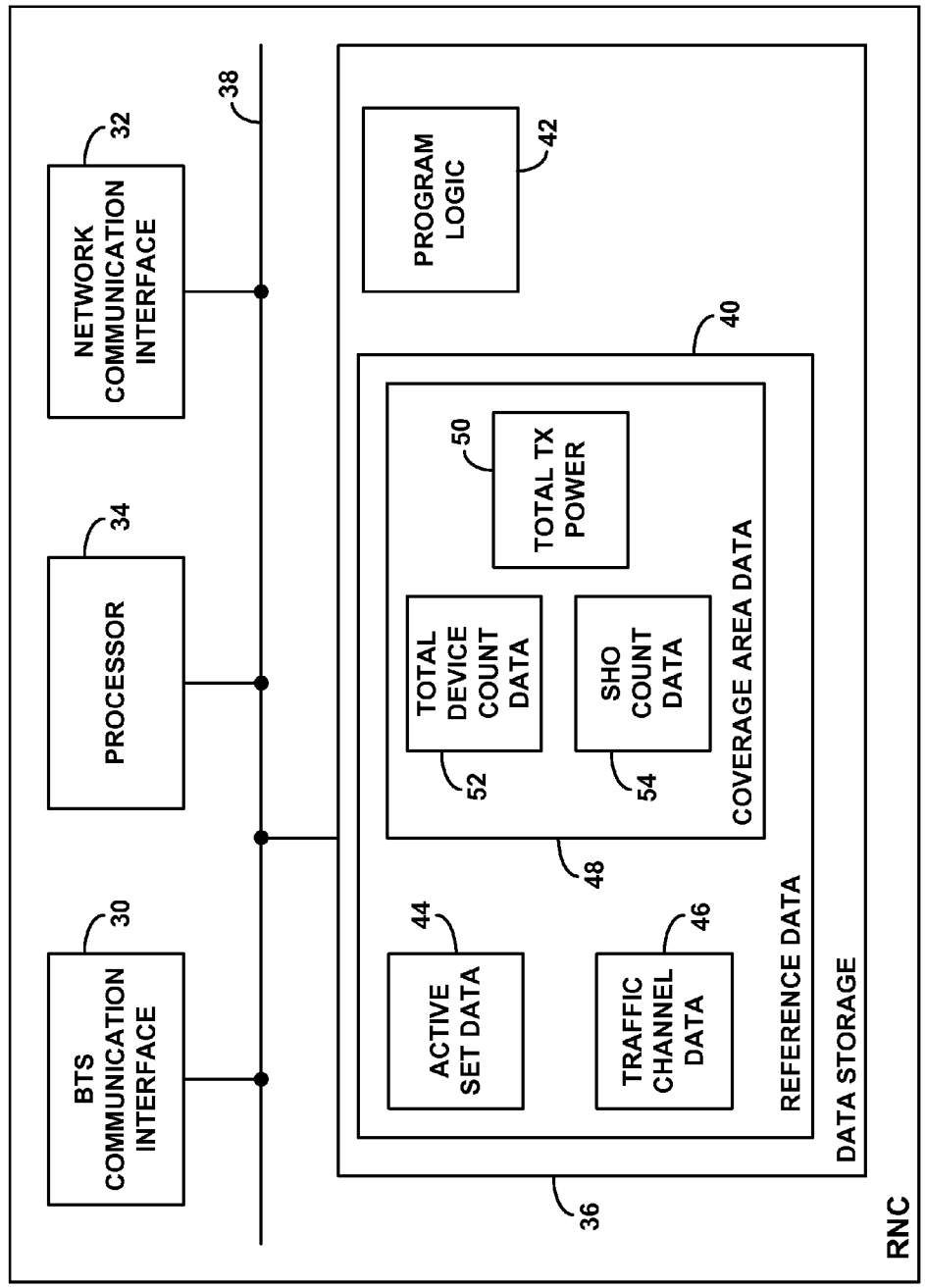
FIG. 2 is a simplified block diagram of a radio network controller operable in the arrangement of FIG. 1.

FIG. 2 is next a simplified block diagram of RNC 16, showing components that can be included in that or another node (i.e., single device or combination of devices) to facilitate implementation of the present method by way of example. As shown, the example RNC includes a BTS communication interface 30, a network communication interface 32, a processor 34, and data storage 36, all of which may be communicatively linked together by a system bus, network, or other connection mechanism 38. Although various components are shown as being integral to the RNC, it will be understood that components can instead be located external to the RNC and can, perhaps be accessed or invoked by the RNC. Further, various components can be combined together, distributed, eliminated, added, or otherwise modified.

In the example arrangement shown, the BTS communication interface 38 functions to connect with backhaul links to each BTS under control of the RNC. The network communication interface 32, in turn, functions to connect with other RAN infrastructure or network components (not shown), such as a mobile switching center that provides connectivity with the PSTN and/or a packet data serving node that provides connectivity with a packet-switched network such as the Internet.

Processor 34 comprises one or more general purposes processors (e.g., INTEL processors) and/or one or more special purpose processors (e.g., digital signal processors or application specific integrated circuits). Data storage 36, in turn, comprises one or more volatile and/or non-volatile storage components such as magnetic, optical, flash, or organic memory, and can be integrated in whole or in part with processor 34. As shown, data storage 36 preferably contains reference data 40 and program logic 42. More generally, this data and/or logic can be stored on any non-transitory machine readable medium.

Reference data 40 may comprise a number of data tables, maintained in a relational database format or other format, to facilitate implementation of the present method. As shown, for instance, the data may include active-set data 44, traffic-channel data 46, and coverage-area data 48. The active-set data 44 may specify for each active user device the one or more coverage areas in which the user device is currently active. The traffic-channel data 46 may specify for each traffic channel the power level at which the serving BTS is currently set to transmit on the traffic channel. And the coverage area data 48 specifies metrics on a per coverage area basis. For instance, the coverage area data 48 may specify the total transmission power 50 being output by the serving BTS (e.g., for traffic channels in total, or for all channels in total). Further, the coverage area data 48 may specify a total device count 52 indicating how many user devices are currently active in the coverage area (perhaps rolled up from a regular analysis of the active-set data 44). And the coverage area data 48 may additionally specify a SHO count 54 indicating how many user devices are currently in soft handoff with the coverage area and at least one other coverage area (perhaps also rolled up from a regular analysis of the active-set data 44, and perhaps regarding any soft handoff, or specifically regarding soft handoff with a particular adjacent coverage area).

Preferably, reference data 40 includes historical data and, perhaps, statistical rolled up metrics (e.g., rolling averages, etc.) to facilitate evaluation of changes in the data over time. Thus, for instance, by reference to the SHO count data 54, the RNC may determine that the SHO count for a given coverage area has increased a threshold extent (e.g., a particular percentage increase or integer increase over a particular period of time). Further, by reference to the total transmission power 50, the RNC may determine that the total transmission power of used by the BTS for transmissions in the coverage area has increased by a threshold extent in some defined period of time, and by reference to the total device count 52, the RNC may determine that the total number of active devices in the coverage area has not increased by a threshold extent in the defined period.

Program logic 42 may comprise machine language instructions executable by processor 34 to carry out the various functions described herein. It should be understood, however, that some or all of these functions could be implemented in other ways as well, such as by any combination of hardware, firmware and/or software, in manners now known or later developed.

Figure 3:
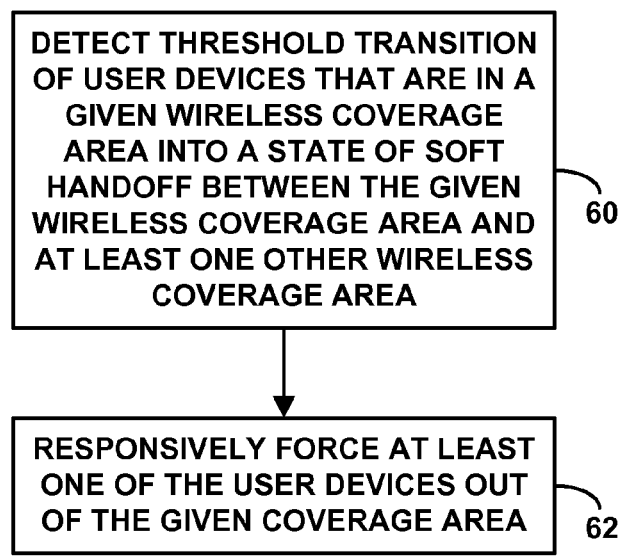
FIG. 3 is a flow chart depicting functions that can be carried out in accordance with the exemplary method.

FIG. 3 is a flow chart depicting functions that can be carried out by RNC 16 and/or other node (e.g., generally one or more physical components of a radio access network) in accordance with the present method.

As shown in FIG. 3, at block 60, the RNC first detects a threshold transition of user devices that are in a given wireless coverage area into a state of soft handoff between the given wireless coverage area and at least one other wireless coverage area. For instance, through regular monitoring of the total device count data 52 and SHO count data 54 for the coverage area, the RNC may detect that the SHO count for the coverage area has increased a threshold extent (e.g., to a defined value, such as two or more, or by a defined percentage) and that there has not been a corresponding increase in the total device count for the coverage area. One way to make this determination is to maintain and monitor a ratio of SHO count for the coverage area to total device count for the coverage area. If the ratio rises a threshold extent, the RNC may reasonably conclude that the SHO count increased a threshold extent without a corresponding increase in total device count, which may mean that there has been a threshold transition of user devices in the coverage area into a state of soft handoff with the coverage area. Other ways to make this determination may be possible as well.

The function of detecting a threshold transition of user devices into a state of soft handoff between the given wireless coverage area and at least one other wireless coverage area may relate generally to devices transitioning from operating in the given wireless coverage area not being in a state of soft handoff at all to being in a state of soft handoff between the given wireless coverage area and at least one other wireless coverage area. Alternatively, the function may relate more specifically to devices transitioning to be in a state of soft handoff between the given wireless coverage area and one or more other particular coverage areas, regardless of whether the devices were already in a state of soft handoff (but just not with the one or more particular coverage areas). For instance, given three coverage areas A, B, and C, the function may involve detecting transition of devices from a state of operating in just coverage area A (the given coverage area) to operating in both coverage area A and coverage area B (the other coverage area), or the function may involve detecting transition of devices from a state of operating in coverage area A (and perhaps coverage area C), to operating in coverage area A and coverage area B (and perhaps still coverage area C). Other variations are possible as well.

At block 62, in response to detecting that threshold transition, the RNC then forces at least one of the user devices out of the given coverage area. For instance, the RNC may autonomously send to each such user device a handoff direction message that provides the user device with a new active set that excludes the given coverage area but that still includes each other coverage area that the user device's active set included before the directive, and the RNC may correspondingly release the traffic channel that had been assigned to the user device for use in the given coverage area. Alternatively, the RNC may send some other sort of command to each such user device that, alone or in combination with other functions, causes the user device to stop actively operating in the given coverage area. Advantageously, because each such user device that is thereby forced out of the given coverage area was in soft handoff with the coverage area at the time it was forced out, the user device will continue active operation in at least one other coverage area of its active set.

If the RNC will force out just a proper subset of user devices that are currently in soft handoff with the given coverage area, the RNC may select one or more user devices in various ways. For example, the RNC may select the user device(s) that have a lowest assigned service level. As another example, the RNC may select the user device(s) each having another active set member for which the user device most recently reported a stronger received pilot than the user device reported for the given coverage area (so that the user devices could beneficially continue to operate in its stronger coverage area). And as another example, the RNC may randomly select the user device(s). Other examples are possible as well.

Figure 4:
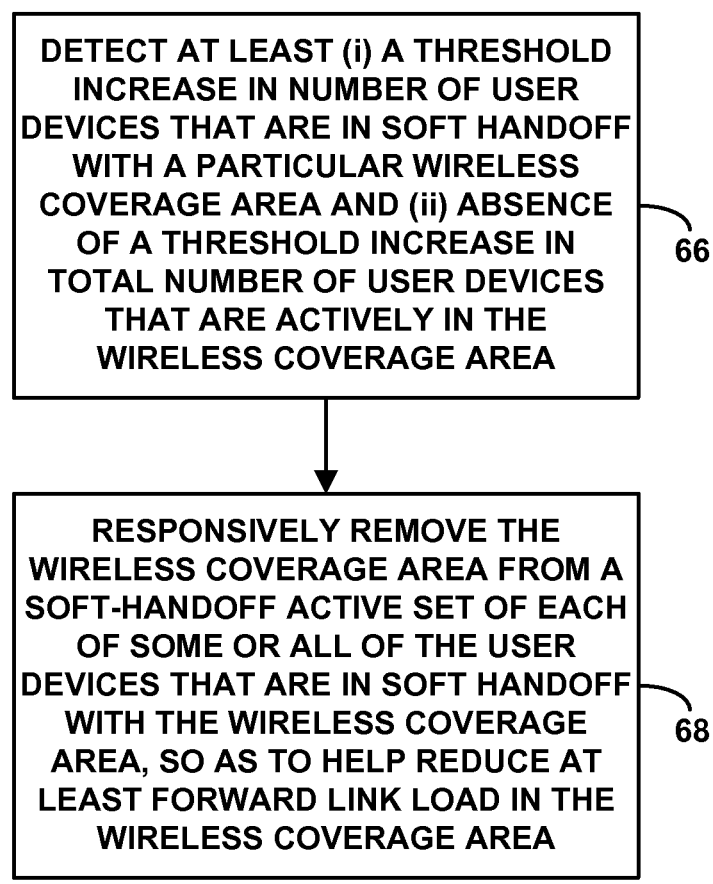
FIG. 4 is another flow chart depicting functions that can be carried out in accordance with the exemplary method.

FIG. 4 is next another flow chart depicting functions that can be carried out by RNC 16 and/or other node (again, generally one or more physical components of a radio access network) in accordance with the present method, to manage operation in a cellular wireless network.

As shown in FIG. 4, at block 66, the method involves detecting at least (i) a threshold increase in number of user devices that are in soft handoff with a particular wireless coverage area and (ii) absence of a threshold increase in total number of user devices that are actively in the wireless coverage area. This detecting function may involve considering a ratio between SHO count and total device count as discussed above. More specifically, however, the function may involve separately considering whether the total device count has increased by a threshold extent and whether the SHO count has not correspondingly increased a threshold extent. These two thresholds can be the same, or they can be different. For instance, the issue can be whether the SHO count has increased more than any increase in total device count, which may reasonably suggest a threshold transition of devices active in the coverage area into a state of soft handoff between the coverage area and at least one other coverage area. Alternatively, the issue can be whether the increase in SHO count is at least a certain extent greater than any increase in total device count. In either case, the conclusion is most clear if there is no change in total device count while there is at least some defined increase (preferably to more than two user devices) in SHO count, but the method may apply even when there is some change in total device count.

At block 68, the method then involves, responsive to the detecting, removing the wireless coverage area from a soft-handoff active set of each of some or all of the user devices that are in soft handoff with the wireless coverage area, so as to help reduce at least forward link load in the wireless coverage area. This function may proceed largely in the manner noted above with respect to step 62 of FIG. 3.

Figure 5:
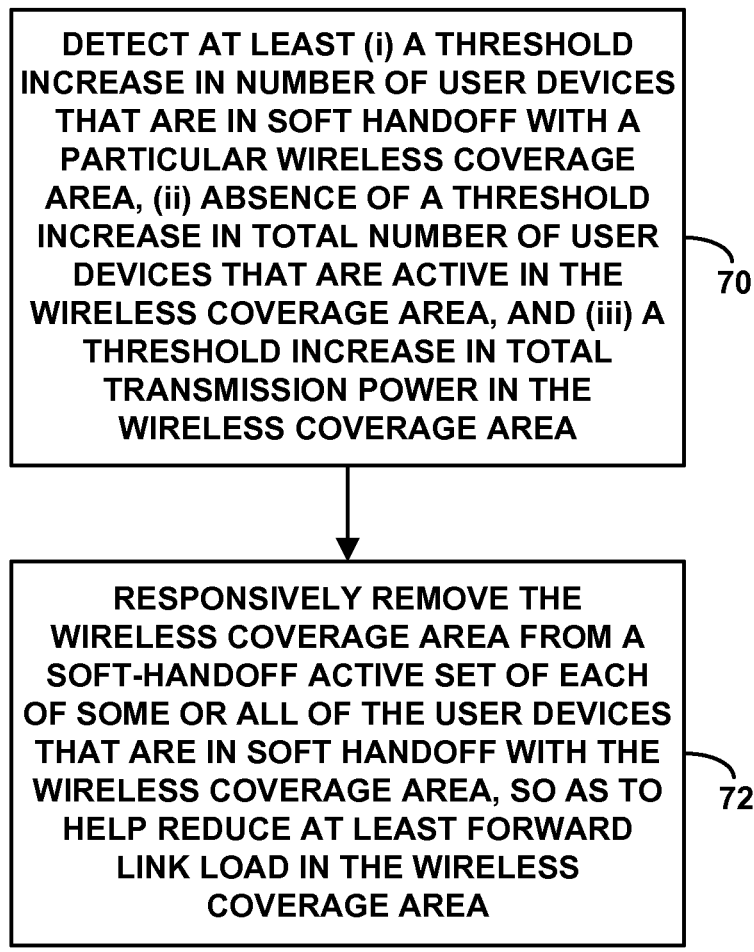
FIG. 5 is another flow chart depicting functions that can be carried out in accordance with the exemplary method.

FIG. 5 is next a flow chart depicting an enhancement of the method of FIG. 4. In particular, FIG. 5 adds a function of the RNC considering total transmission power in the wireless coverage area. The theory here is that if the SHO count of the coverage area has increased a threshold extent without a threshold increase in total device count for the coverage area, then a threshold increase in total transmission power of the coverage area (to a defined extent that is not yet itself an overload condition) may be a sign that the coverage area may soon become overloaded due to the cyclic power effect discussed above. Thus, according to the method of FIG. 4, the function of detecting (in response to which one or more user devices are removed from soft handoff with the coverage area) includes not only detecting threshold increase in SHO count and absence of threshold increase in total device count, but also detecting a threshold increase in total transmission power in the coverage area. This total transmission power is transmission power used for transmissions from the serving BTS (i.e., forward link transmission power) and may be defined in various ways, such as including the power for all channels including control channels and traffic channels or just the power for traffic channels for instance.

Thus, referring to FIG. 5, at block 70, the method involves detecting at least (i) a threshold increase in number of user devices that are in soft handoff with a particular wireless coverage area, (ii) absence of a threshold increase in total number of user devices that are active in the wireless coverage area, and (iii) a threshold increase in total transmission power in the wireless coverage area. And at block 72, the method involves, responsive to the detecting, removing the wireless coverage area from a soft-handoff active set of each of some or all of the user devices that are in soft handoff with the wireless coverage area, so as to help reduce at least forward link load in the wireless coverage area.

In practice, the detecting function in this process may involve first detecting the threshold increase in SHO count, and then, responsive to that first detecting, evaluating the total transmission power and total device count and thereby determining that there is an absence of threshold increase in total device count for the coverage area and that, within a defined period of time after the first detecting (e.g., starting with the first detecting), there is the threshold increase in total transmission power in the wireless coverage area. Thus, the RNC may regularly monitor SHO count for the coverage area, and a threshold increase in SHO count may be a trigger for the RNC to then check whether there is an absence of threshold increase in total device count and whether, within some defined time period, there is a threshold increase in forward link transmission power in the coverage area, suggesting that the cyclic power increase effect has begun. The RNC may then proactively work to stop the effect from continuing, by removing one or more devices from soft handoff with the coverage area.

Figure 6:
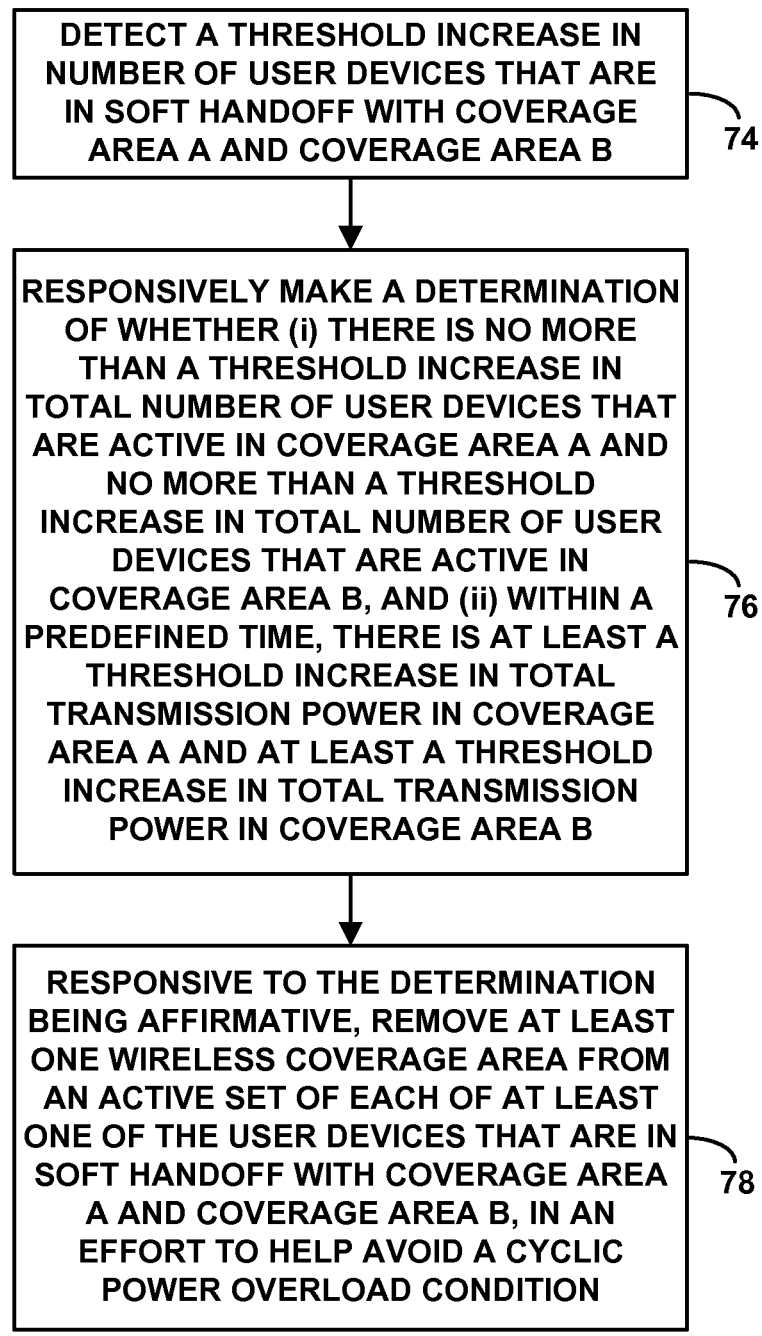
FIG. 6 is another flow chart depicting functions that can be carried out in accordance with the exemplary method.

FIG. 6 is next another flow chart depicting functions that can be carried out by RNC 16 and/or other node (again, generally one or more physical components of a radio access network) in accordance with the present method, to manage device operation in a cellular wireless network. The arrangement of FIG. 6 illustrates that the method can involve consideration of the cyclic effect in each of two (or more) coverage areas that overlap with each other, since user devices in the overlap area may experience interference from both and may request both to increase power and so forth as discussed above. For purposes of simplicity, FIG. 6 assumes that the overlapping coverage areas are coverage areas A and B, as shown in FIG. 1 for instance.

As shown in FIG. 6, at block 74, the method involves first detecting a threshold increase in number of user devices that are in soft handoff with coverage area A and coverage area B. The RNC may do this by evaluating the active-set data 44 over time, monitoring the number of user devices that each have both coverage area A and coverage area B listed in their active set. By tracking the change in that number over time, the RNC can detect that the number increases by a threshold extent, over a defined period of time for instance, such as increasing to a particular value (preferably a value that is two or more) or increasing by a threshold percentage, or the like.

At block 76, the method then involves, in response to the detecting, making a determination of whether (i) there is no more than a threshold increase in total number of user devices that are active in coverage area A and no more than a threshold increase in total number of user devices that are active in coverage area B, and (ii) within a predefined time, there is at least a threshold increase in total transmission power in coverage area A and at least a threshold increase in total transmission power in coverage area B. This function is largely analogous to the function discussed above with respect to just the given coverage area, but here, the analysis is made with respect to both coverage area A and coverage area B, to support a reasonable conclusion that the cyclic power increase effect has begun in both of the coverage areas. In carrying out this function, the thresholds applied for the two coverage areas (e.g., the thresholds applied for total device count increase, and/or the thresholds applied for total power increase) could be the same as each other or could be different.

At block 78, the method then involves, responsive to the determination being affirmative, removing at least one wireless coverage area from an active set of each of at least one of the user devices that are in soft handoff with coverage area A and coverage area B, in an effort to help avoid a cyclic power overload condition. In carrying out this function, the RNC may select all or a proper subset of the user devices that are in soft handoff with coverage areas A and B, in a manner similar to that discussed above with respect to the given coverage area. Further, in removing the one or more coverage areas from the active set of each selected user device, the RNC will preferably leave in the user device's active set at least the user device's strongest coverage area (e.g., the coverage area for which the user device most recently reported a strongest pilot signal strength), so that the user device can continue operating in at least that strongest coverage area.

As with the method above with respect to the given coverage area, the act of removing at least one coverage area from the active set of each selected user device may involve sending to the user device via an air interface a command that causes the user device to remove the at least one wireless coverage area from the user device's active set. For instance, as discussed above, the RNC may autonomously transmit a handoff direction message to the user device, providing the user device with a new active set that excludes each coverage area being removed from the user device's active set.

Exemplary embodiments of the present method has been disclosed above. Those of ordinary skill in the art will appreciate, however, that numerous changes to the discloses embodiments can be made without deviating from the general spirit and scope of the invention as defined by the claims. For instance, functions discussed above as being carried out with respect to a given coverage area could be carried out by analogy with respect to each of various overlapping coverage areas, with one or more required conditions (e.g., threshold increases or absence of threshold increases) being required for each coverage area. Other variations are possible as well.

We claim:

1. A method comprising:
    a radio access network detecting a threshold transition of user devices that are active in a given wireless coverage area into a state of soft handoff between the given wireless coverage area and at least one other wireless coverage area; and
    in response to detecting the threshold transition, the radio access network forcing at least one of the user devices out of the given wireless coverage area,
    whereby, because each user device thereby forced out of the given wireless coverage area was in soft handoff with the given wireless coverage area at the time it was forced out, the user device will continue active operation in at least one other coverage area.

2. A method for managing operation in a cellular wireless network, the method comprising:
    detecting at least (i) a threshold increase in number of user devices that are in soft handoff with a particular wireless coverage area and (ii) absence of a threshold increase in total number of user devices that are active in the wireless coverage area; and
    responsive to the detecting, removing the wireless coverage area from a soft-handoff active set of each of some or all of the user devices that are in soft handoff with the wireless coverage area, so as to help reduce at least forward link load in the wireless coverage area.

3. The method of claim 2, wherein detecting at least (i) the threshold increase in number of user devices that are in soft handoff with a particular wireless coverage area and (ii) absence of the threshold increase in total number of user devices that are active in the wireless coverage area comprises detecting at least (i) the threshold increase in number of user devices that are in soft handoff with a particular wireless coverage area, (ii) absence of the threshold increase in total number of user devices that are active in the wireless coverage area, and (iii) a threshold increase in total transmission power in the wireless coverage area.

4. The method of claim 3, wherein the detecting comprises:
    first detecting the threshold increase in number of user devices that are in soft handoff with the particular wireless coverage area;
    responsive to the first detecting, evaluating change in the total transmission power and change in total number of user devices operating in the wireless coverage area and thereby determining that (a) there is the absence of threshold increase in total number of user devices that are active in the wireless coverage area and (b) within a defined period of time after the first detecting, there is the threshold increase in total transmission power in the wireless coverage area.

5. The method of claim 4, wherein defined period of time begins with the first detecting.

6. The method of claim 3, wherein the cellular wireless network comprises at least one base station radiating to define the wireless coverage area, and wherein the total transmission power in the wireless coverage area is a total forward link transmission power used by the at least one base station for the wireless coverage area.

7. The method of claim 2, wherein detecting the threshold increase in number of user devices that are in soft handoff with the wireless coverage area comprises detecting that the number of user devices that are in soft handoff with the wireless coverage area has increased to a value that is at least two.

8. The method of claim 2, wherein removing the wireless coverage area from a soft-handoff active set of each of some or all of the user devices comprises:
   transmitting via an air interface to each of the some or all user devices a command that causes the user device to remove the wireless coverage area from an active set of the user device.

9. The method of claim 2, wherein the devices that are in soft handoff with the particular wireless coverage area consist of devices in soft handoff between the particular wireless coverage area and a particular other wireless coverage area.

10. A node operable in a cellular wireless network, the node comprising:
   a communication interface;
   a processor;
   data storage;
   detection logic in the data storage and executable by the processor for detecting at least (i) a threshold increase in number of user devices that are in soft handoff with a particular wireless coverage area and (ii) absence of a threshold increase in total number of user devices that are active in the wireless coverage area; and
   removal logic in the data storage and executable by the processor, responsive to the detecting, to remove the wireless coverage area from a soft-handoff active set of some or all of the user devices that are in soft handoff with the wireless coverage area, so as to help reduce at least forward link load in the wireless coverage area.

11. The node of claim 10, embodied as a radio network controller.

12. The node of claim 10, wherein detecting at least (i) the threshold increase in number of user devices that are in soft handoff with a particular wireless coverage area and (ii) absence of the threshold increase in total number of user devices that are active in the wireless coverage area comprises detecting at least (i) the threshold increase in number of user devices that are in soft handoff with a particular wireless coverage area, (ii) absence of the threshold increase in total number of user devices that are active in the wireless coverage area, and (iii) a threshold increase in total transmission power in the wireless coverage area.

13. The node of claim 12, wherein the detection logic is executable to (a) first detect the threshold increase in number of user devices that are in soft handoff with the particular wireless coverage area and (b) responsive to the first detecting, evaluate change in the total transmission power and change in total number of user devices that are active in the wireless coverage area and thereby determine that there is the absence of threshold increase in total number of user devices that are active in the wireless coverage area and that, within a defined period of time after the first detecting, there is the threshold increase in total transmission power in the wireless coverage area.

14. The node of claim 13, wherein defined period of time begins with the first detecting.

15. The node of claim 12, wherein the cellular wireless network comprises at least one base station radiating to define the wireless coverage area, and wherein the total transmission power in the wireless coverage area is a total forward link transmission power used by the at least one base station for the wireless coverage area.

16. The node of claim 10, wherein the detection logic is executable to detect the threshold increase in number of user devices that are in soft handoff with the wireless coverage area by detecting that the number of user devices that are in soft handoff with the wireless coverage area has increased to a value that is at least two.

17. The node of claim 10, wherein the removal logic is executable to remove the wireless coverage area from a soft-handoff active set of each of some or all of the user devices by transmitting via an air interface to each of the some or all user devices a command that causes the user device to remove the wireless coverage area from the wireless device's soft-handoff active set.

18. A method for managing device operation in a cellular wireless network, the network defining at least a first wireless coverage area and a second wireless coverage area, the first and second wireless coverage areas partially overlapping with each other, the method comprising:
   detecting a threshold increase in number of user devices that are in soft handoff with the first wireless coverage area and second wireless coverage area;
   responsive to the detecting, making a determination of whether (i) there is no more than a threshold increase in total number of user devices that are active in the first wireless coverage area and no more than a threshold increase in total number of user devices that are active in the second wireless coverage area, and (ii) within a predefined time, there is at least a threshold increase in total transmission power in the first wireless coverage area and at least a threshold increase in total transmission power in the second wireless coverage area; and
   responsive to the determination being affirmative, removing at least one wireless coverage area from an active set of each of at least one of the user devices that are in soft handoff with the first wireless coverage area and second wireless coverage area, in an effort to help avoid a cyclic power overload condition.

19. The method of claim 18, wherein the predefined time is measured from the detecting.

20. The method of claim 18,
   wherein the cellular wireless network comprises at least one base station radiating to define the first wireless coverage area and the second wireless coverage area and to serve user devices operating in those wireless coverage areas, and
   wherein the total transmission power in the first wireless coverage area is total forward link transmission power used by the at least one base station to define the first wireless coverage area, and the total transmission power in the second wireless coverage area is total forward link transmission power used by the at least one base station to define the second wireless coverage area.

21. The method of claim 18,
   wherein the active set of each of the at least one user device in soft handoff with the first wireless coverage area and second wireless coverage area comprises a plurality of wireless coverage areas including a strongest of the plurality, and
   wherein removing the at least one wireless coverage area from an active set of each of the at least one user device comprises performing the removing in a manner that leaves the strongest wireless coverage area in the active set.

22. The method of claim 18, wherein removing at least one wireless coverage area from the active set of each of the at least one user device comprises sending to each such user device via an air interface a command that causes the user device to remove the at least one wireless coverage area from the user device's active set.

* * * * *